(12) United States Patent
Modlin et al.

(10) Patent No.: US 7,712,249 B1
(45) Date of Patent: May 11, 2010

(54) ULTRASONIC HUMIDIFIER FOR REPELLING INSECTS

(75) Inventors: Kemper O'neal Modlin, Conroe, TX (US); Leo JohnNiekerk, Spring, TX (US)

(73) Assignee: Monster Mosquito Systems, LLC, Spring, TX (US)

( * ) Notice: Subject to any disclaimer, the term of this patent is extended or adjusted under 35 U.S.C. 154(b) by 253 days.

(21) Appl. No.: 11/985,816

(22) Filed: Nov. 16, 2007

(51) Int. Cl.
*A01M 13/00* (2006.01)
*A01M 7/00* (2006.01)

(52) U.S. Cl. .................. 43/132.1; 43/125; 43/129; 261/81; 239/102.2

(58) Field of Classification Search .......... 43/132.1, 43/107, 112, 113, 139, 125, 129; 261/81; 239/102.2, 102.1, 326, 44
See application file for complete search history.

(56) References Cited

U.S. PATENT DOCUMENTS

| | | | | |
|---|---|---|---|---|
| 1,745,838 A | * | 2/1930 | Rosenow | 239/44 |
| 2,083,950 A | * | 6/1937 | Guba | 43/129 |
| 2,576,976 A | * | 12/1951 | Stagner | 43/129 |
| 2,662,332 A | * | 12/1953 | McIntire | 43/129 |
| 2,851,818 A | * | 9/1958 | Matheny | 43/129 |
| 2,867,360 A | * | 1/1959 | Sharma | 43/125 |
| 3,074,199 A | * | 1/1963 | Johnson et al. | 43/129 |
| 3,200,535 A | * | 8/1965 | Hession, Jr. | 43/129 |
| 3,387,607 A | * | 6/1968 | Gauthier et al. | 239/102.2 |
| 3,469,785 A | * | 9/1969 | Tobin et al. | 239/102.2 |
| 3,490,697 A | * | 1/1970 | Best, Jr. | 239/102.2 |
| 3,648,401 A | * | 3/1972 | Stains | 43/129 |
| 3,690,317 A | * | 9/1972 | Millman | 239/102.1 |
| 3,989,042 A | * | 11/1976 | Mitsui et al. | 239/102.2 |
| 4,031,171 A | * | 6/1977 | Asao et al. | 261/81 |
| 4,087,495 A | * | 5/1978 | Umehara | 261/81 |
| 4,173,651 A | | 11/1979 | Muramoto et al. | |

(Continued)

FOREIGN PATENT DOCUMENTS

EP  554732 A1 *  8/1993

(Continued)

OTHER PUBLICATIONS

Specification Sheet: Piezoceramic Transducer No. SMUTD25F1000R-S-D4238H12, Steiner & Martins, Inc., Mar. 2004.

(Continued)

*Primary Examiner*—Darren W Ark
(74) *Attorney, Agent, or Firm*—Rudolph J. Buchel, Jr.

(57) ABSTRACT

The present invention is directed to an ultrasonic repellent humidifier for dispersing insect repellant into the air as a micro fine repellent vapor. A repellent tank provides rhodinol and cedarwood oil based repellent to a repellent well. An ultrasonic transducer is positioned in the well beneath the level of the repellent. It vibrates, forming a repellant vapor that is drawn into a vapor duct by a forced air system and out of the unit, dispersing the repellent vapor into the surrounding air. The vibrating portion of the ultrasonic transducer that is exposed to the oil-based repellent is a ceramic material that inhibits residue from forming on the transducer that reduces its efficiency. The ceramic material may be formed on the metal case of the transducer or on the piezoelectric oscillation crystal, or it may be a separately replaceable disc.

36 Claims, 9 Drawing Sheets

U.S. PATENT DOCUMENTS

| | | | |
|---|---|---|---|
| 4,238,425 A * | 12/1980 | Matsuoka et al. | 261/81 |
| 4,257,989 A * | 3/1981 | Nishikawa | 261/81 |
| RE31,023 E | 9/1982 | Hall, III | |
| 4,519,776 A * | 5/1985 | DeYoreo et al. | 43/132.1 |
| 4,563,313 A * | 1/1986 | Tsuaki | 261/81 |
| 4,625,453 A * | 12/1986 | Smith | 43/139 |
| 4,631,152 A * | 12/1986 | Uchida et al. | 261/81 |
| 4,640,804 A * | 2/1987 | Mizoguchi | 261/81 |
| 4,641,053 A * | 2/1987 | Takeda | 239/102.2 |
| 4,644,790 A * | 2/1987 | Mizoguchi | 261/81 |
| 4,663,091 A * | 5/1987 | Seo | 261/81 |
| 4,665,393 A | 5/1987 | Wilder et al. | |
| 4,708,826 A * | 11/1987 | Mizoguchi | 261/81 |
| 4,719,057 A * | 1/1988 | Mizoguchi | 261/81 |
| 4,731,204 A * | 3/1988 | Noma et al. | 261/81 |
| 4,746,466 A * | 5/1988 | Takahashi | 261/81 |
| 4,752,422 A * | 6/1988 | Uchida et al. | 261/81 |
| 4,752,423 A | 6/1988 | Wong | |
| 4,776,990 A * | 10/1988 | Verity | 261/81 |
| 4,882,096 A | 11/1989 | Rueben | |
| 4,911,866 A * | 3/1990 | Monroe | 261/81 |
| 4,921,639 A * | 5/1990 | Chiu | 261/81 |
| 4,986,937 A * | 1/1991 | Sorio | 261/81 |
| 5,020,270 A * | 6/1991 | Lo | 43/112 |
| 5,037,583 A * | 8/1991 | Hand | 261/26 |
| 5,123,201 A * | 6/1992 | Reiter | 43/107 |
| 5,157,865 A * | 10/1992 | Chang | 43/113 |
| 5,167,090 A * | 12/1992 | Cody | 43/139 |
| 5,176,856 A * | 1/1993 | Takahashi et al. | 261/81 |
| 5,205,064 A * | 4/1993 | Nolen | 43/112 |
| 5,205,065 A * | 4/1993 | Wilson et al. | 43/107 |
| 5,217,165 A * | 6/1993 | Takahashi et al. | 239/102.2 |
| 5,221,025 A | 6/1993 | Privas | |
| 5,228,233 A * | 7/1993 | Butler et al. | 43/107 |
| 5,241,778 A * | 9/1993 | Price | 43/132.1 |
| 5,241,779 A * | 9/1993 | Lee | 43/139 |
| 5,299,739 A | 4/1994 | Takahashi et al. | |
| 5,300,260 A * | 4/1994 | Keshet et al. | 261/81 |
| 5,311,697 A * | 5/1994 | Cavanaugh et al. | 43/132.1 |
| 5,354,515 A * | 10/1994 | Ushimaru | 261/81 |
| 5,407,604 A * | 4/1995 | Luffman | 261/81 |
| 5,417,009 A * | 5/1995 | Butler et al. | 43/113 |
| 5,595,018 A * | 1/1997 | Wilbanks | 43/139 |
| 5,647,164 A * | 7/1997 | Yates | 43/139 |
| 5,653,919 A * | 8/1997 | White et al. | 261/81 |
| 5,657,926 A | 8/1997 | Toda | |
| 5,669,176 A * | 9/1997 | Miller | 43/139 |
| 5,693,266 A * | 12/1997 | Jung | 261/81 |
| 5,779,804 A * | 7/1998 | Mikoshiba et al. | 261/81 |
| 5,799,436 A * | 9/1998 | Nolen et al. | 43/112 |
| 5,803,362 A | 9/1998 | Fraccaroli | |
| 5,813,166 A * | 9/1998 | Wigton et al. | 43/139 |
| 5,916,490 A * | 6/1999 | Cho | 261/81 |
| 5,943,815 A * | 8/1999 | Paganessi et al. | 43/132.1 |
| 6,032,406 A * | 3/2000 | Howse et al. | 43/107 |
| 6,050,025 A * | 4/2000 | Wilbanks | 43/139 |
| 6,055,766 A * | 5/2000 | Nolen et al. | 43/112 |
| 6,134,826 A * | 10/2000 | Mah | 43/112 |
| 6,244,576 B1 * | 6/2001 | Tsai | 261/81 |
| 6,272,790 B1 * | 8/2001 | Paganessi et al. | 43/132.1 |
| 6,293,044 B1 * | 9/2001 | Feng | 43/129 |
| 6,293,474 B1 | 9/2001 | Helf et al. | |
| 6,301,433 B1 * | 10/2001 | Montagnino et al. | 261/79.2 |
| 6,339,897 B1 * | 1/2002 | Hayes et al. | 43/132.1 |
| 6,361,024 B1 | 3/2002 | Carson | |
| 6,439,474 B2 | 8/2002 | Denen | |
| 6,530,172 B2 * | 3/2003 | Lenz | 43/112 |
| 6,554,203 B2 | 4/2003 | Hess et al. | |
| 6,557,778 B1 | 5/2003 | Shiffler | |
| 6,568,124 B1 * | 5/2003 | Wilbanks | 43/139 |
| 6,591,545 B2 * | 7/2003 | Brunet | 43/112 |
| 6,594,946 B2 * | 7/2003 | Nolen et al. | 43/107 |
| 6,595,208 B1 | 7/2003 | Coffee et al. | |
| 6,601,777 B2 | 8/2003 | Sun et al. | |
| 6,619,562 B2 * | 9/2003 | Hamaguchi et al. | 239/102.1 |
| 6,655,080 B2 * | 12/2003 | Spiro et al. | 43/139 |
| 6,662,489 B2 * | 12/2003 | Spiro et al. | 43/107 |
| 6,663,307 B2 | 12/2003 | Kopanic et al. | |
| 6,675,528 B2 * | 1/2004 | Jablin | 43/132.1 |
| 6,739,518 B1 | 5/2004 | Davis et al. | |
| 6,793,205 B2 * | 9/2004 | Eom | 261/81 |
| 6,802,460 B2 | 10/2004 | Hess et al. | |
| 6,805,307 B2 | 10/2004 | Dorendorf et al. | |
| 6,823,622 B2 * | 11/2004 | Lin et al. | 43/107 |
| 6,854,208 B1 * | 2/2005 | Chuang et al. | 43/132.1 |
| 6,871,792 B2 | 3/2005 | Pellizzari | |
| 6,877,271 B2 * | 4/2005 | Hughes et al. | 43/132.1 |
| 6,898,896 B1 * | 5/2005 | McBride et al. | 43/139 |
| 6,920,716 B2 * | 7/2005 | Kollars et al. | 43/107 |
| 6,923,383 B1 | 8/2005 | Joshi et al. | |
| 6,962,329 B2 * | 11/2005 | Bachert | 261/81 |
| 6,994,328 B2 * | 2/2006 | Watkins et al. | 261/81 |
| 7,007,861 B2 * | 3/2006 | Ketcha et al. | 239/326 |
| 7,036,800 B2 | 5/2006 | Ellis | |
| 7,073,287 B2 * | 7/2006 | Lau | 43/107 |
| 7,073,731 B2 | 7/2006 | Hess et al. | |
| 7,073,734 B2 | 7/2006 | Dorendorf et al. | |
| 7,083,112 B2 | 8/2006 | Ivri | |
| 7,104,463 B2 | 9/2006 | Litherland et al. | |
| 7,105,058 B1 | 9/2006 | Sinyagin | |
| 7,152,809 B2 * | 12/2006 | Ketcha et al. | 239/326 |
| 7,168,630 B1 * | 1/2007 | Ketcha et al. | 43/132.1 |
| 7,223,361 B2 * | 5/2007 | Kvietok et al. | 239/326 |
| 7,234,268 B2 * | 6/2007 | Welch | 43/112 |
| 7,320,439 B2 * | 1/2008 | Davis et al. | 43/132.1 |
| 7,467,786 B2 * | 12/2008 | Jae-Bong et al. | 261/81 |
| 2002/0159916 A1 * | 10/2002 | Whitby et al. | 43/129 |
| 2006/0091570 A1 * | 5/2006 | Reece | 239/44 |
| 2006/0137241 A1 * | 6/2006 | Yamasaki et al. | 43/132.1 |
| 2006/0179708 A1 * | 8/2006 | Garland | 43/132.1 |
| 2006/0261188 A1 * | 11/2006 | Ito et al. | 43/132.1 |
| 2007/0011940 A1 * | 1/2007 | Chen et al. | 43/107 |
| 2007/0152356 A1 * | 7/2007 | Huang | 261/81 |
| 2007/0157508 A1 * | 7/2007 | Chang | 43/139 |
| 2007/0235555 A1 * | 10/2007 | Helf et al. | 239/102.2 |
| 2008/0178518 A1 * | 7/2008 | Reece | 43/125 |
| 2008/0290189 A1 * | 11/2008 | Levi | 239/102.2 |

FOREIGN PATENT DOCUMENTS

| | | | |
|---|---|---|---|
| JP | 52000660 | | 1/1975 |
| JP | 03162862 A | * | 7/1991 |
| JP | 04298262 | | 10/1992 |
| JP | 05000040 | | 1/1993 |
| JP | 08215308 A | * | 8/1996 |
| JP | 11056196 A | * | 3/1999 |
| JP | 11285341 A | * | 10/1999 |
| JP | 2004147643 A | * | 5/2004 |
| JP | 2004236508 A | * | 8/2004 |
| WO | WO 9805432 A1 | * | 2/1998 |
| WO | WO 2006061651 A2 | * | 6/2006 |

OTHER PUBLICATIONS

Specification Sheet: Piezoceramic Transducer No. SMUTD15F2800R-RA, Steiner & Martins, Inc., Feb. 2004.

C2003 Instruction Manual, Humidifier Data Sheet, Beijing YADU Indoor Environmental Protection Science & Technology Incorporated, PC CHina.

Specification Sheet: Piezoceramic Transducer No. TPC-H2518-1.65MR, Taiwan Piezo-Ceram Technology Corp., 2001.

Owners Manual, Crofton Ultrasonic Humidifier Model Model HM-858, Schenker International Inc., Referenced prior to Jan. 17, 2006.

Ultrasonic Nebulizer Units, TDK Corporation, Doc. No. 001-01 / 20071011 / ef441_nb., Accessed http://www.tdk.co.jp/tefe02/ef441_nb.pdf Incorporate Type.

Ultrasonic Humidifiers, Department of Energy, Document No. DOE/EE-0180, Nov. 1988.

Buying Guide, Ultrasonic Mist Generator-The Transducer, Mico Inc., http://www.oceanmistmaker.com/foggers.html, last accessed Nov. 16, 2007.

* cited by examiner

EXPLODED CROSS-SECTIONAL VIEW AT A-A

NEBULIZER SECTION
130

TOP VIEW

FRONT VIEW

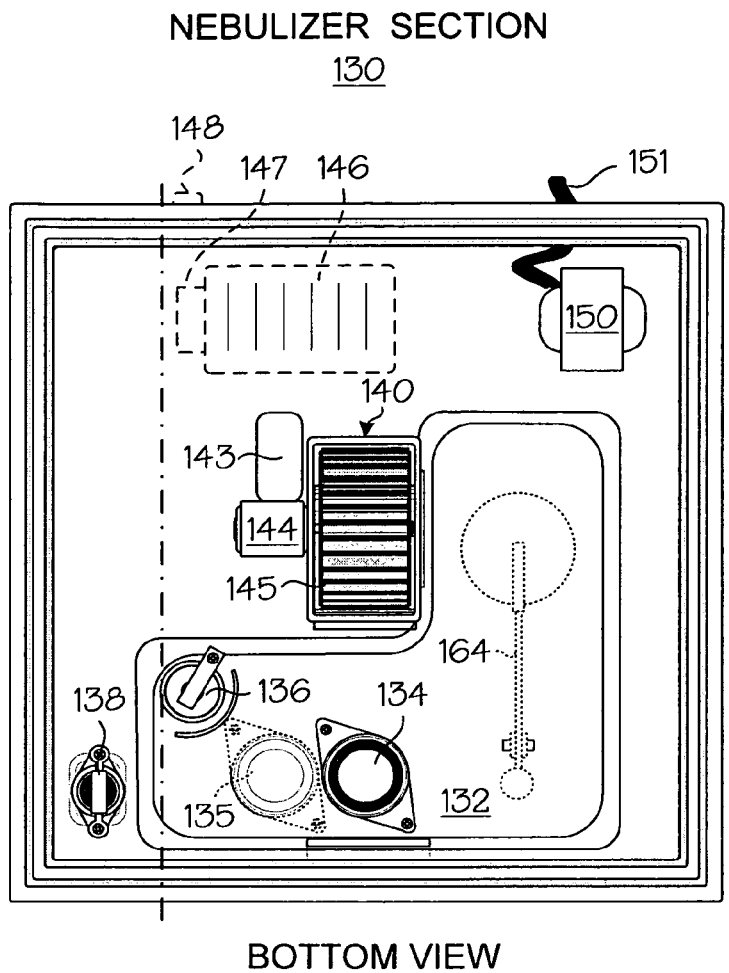
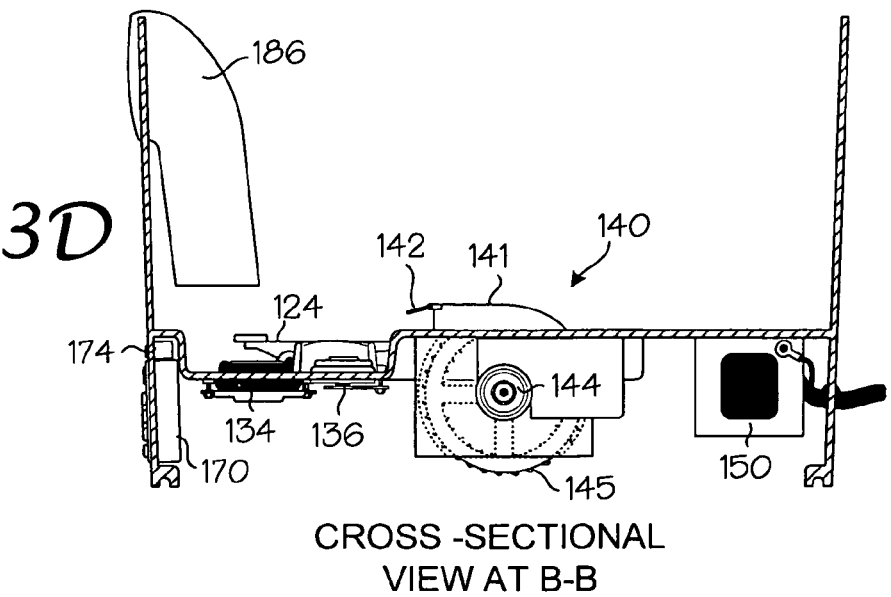

TANK SECTION 120

TOP VIEW

FRONT VIEW

A-A CROSS - SECTIONAL VIEW

BASE SECTION
190

BOTTOM VIEW

FRONT VIEW

CROSS-SECTIONAL
VIEW AT B-B

CROSS-SECTIONAL
VIEW AT A–A

ULTRASONIC HUMIDIFIER FOR REPELLING INSECTS

BACKGROUND OF THE INVENTION

The present invention relates generally to a device for repelling insects. More particularly, the present invention relates to an ultrasonic humidifier for dispersing insect repellant into the air.

Many types of insects and other nuisance bugs are considered pests, because they transmit diseases, damage structures or destroy agricultural products. Parasitic insects, such as mosquitoes, biting flies (black and greenhead), no-see-ums, lice, chiggers, ticks and bedbugs are notorious for decreasing the enjoyment of the out-of-doors for humans and pets alike. The options for pest control are generally limited to killing/capturing or repelling techniques.

Nuisance pests are typically killed through the application of a pesticide, such as by misting an area (see for example U.S. patent Ser. No. 11/524,073 to Modlin, et al. filed Sep. 20, 2006 and entitled "Automated Pest Misting System with Pump," assigned to the assignee of the present invention, which is incorporated herein in its entirety), or through the use of bait and trap systems such as fly strips, $CO_2$/octenol traps or electric bug zappers that attempt to attract pests with scent, heat, chemicals or light, or a combination of the above, and then either trap or kill pests that are lured to the bait. Each of these techniques has the unwanted detriment of killing beneficial insects, such as bees, butterflies, ladybugs and dragonflies, along with the nuisance insects. While there have been some advancements in biocontrol and in luring only nuisance insects to a trap, e.g., luring adult Japanese beetles into traps using beetle pheromones, generally it is difficult to attract unrelated types of nuisance insects to the exclusion of beneficial insects.

To date, one of the most effective method for repelling insects is by applying a coating of insect repellant containing synthesized DEET (n-n-diethylnetatoluamide) over exposed body parts and clothing which mosquitoes might penetrate. Currently DEET is the active ingredient in a wide range of repellants, such as creams, lotions, and aerosols. The disadvantages of using an insect repellent are many. For instance, the oily feel, they cause irritation to eyes, lips and other sensitive areas and can cause a skin reaction with some users, sometimes serious, and DEET is less effective in low concentrations, while higher concentrations may result in an increased risk of reaction. The product will often damage and/or stain certain plastics and fabrics and detractors often complain about the strong 'chemical' smell prevalent with DEET usage. Most people avoid using insect repellents around their home unless they intend to be outside for a prolonged period of time. Moreover, insect repellants are inconvenient and bothersome; they detract from the enjoyment with other people, such as on trips to the beach or camping, tailgating or picnicking.

Another, more convenient and environmentally friendly method for controlling nuisance pests in an area, is by application of a repellant throughout a control area. Although electronic repellants exist, such as by generating sound energy electronically at frequencies that repel insects, by far the most effective means is through the application of chemical repellants. Everyone has probably burned citronella to repel mosquitoes or heard of burning citronella in candles or torches or the like. Citronella candles and lamp fuel is relatively inexpensive, nontoxic and fairly easy to use. The active insect repelling ingredient in citronella, PMD (p-menthane 3,8-diol) has been demonstrated to repel mosquitoes, however, the recommended concentration of PMD is approximately ten percent and then citronella usually only repels mosquitoes for ten to twenty minutes. The reason that burning citronella is not always effective is that oftentimes the airborne concentration of PMD is very low, either because of the concentration being burned, or more probably because the dispersion pattern of the citronella fumes is not homogeneous in the control area. Insects do not breathe the way that mammals do and they do not have lungs, but instead they use tracheal respiration to transport air from spiracle openings on the surface of their bodies. Spiracles are located all along the insects' abdomens. It follows that the more effectively a repellent is dispersed in a control area, the more spiracles on an insect's body will receive the repellent. Burning citronella has been reported to form long airborne 'spider webs' when burned rather than a homogeneous concentration within the control area. Light breezes that do not affect mosquitoes sometimes move the citronella fumes completely out of the control area. Furthermore, it is difficult to meter the amount of citronella in the air, at best the user lights more or less candles or torches and repositions them in the control area for effectiveness.

Handheld trigger sprayers for broadcasting repellents are well known and widely used, especially around farm animals and in kennels and stables. Certain mosquito repellents are also sprayed from trigger or larger pump sprayers. However, these repellants are generally not meant to remain airborne, but are often applied to ground cover, yards, gardens and campgrounds. Typically, these repellants have an aromatic ingredient, such as concentrated garlic solution, that has some repelling properties, but actually kills most insects that come in contact with it. Automated misting systems, such as those disclosed in the Modlin application identified above, may be altered for dispersing repellents rather than insecticides. It should be mentioned that the Modlin device utilizes misting nozzles rather than spray nozzles. Spraying systems are less effective for repelling flying pests because the particle size ejected from a spray head is relatively large, usually greater than 50 microns, and therefore they do not remain suspended in the air for longer than a very few seconds. A mist has fewer open spaces or gaps between particles than a spray, and is generally less dense and will remain airborne longer than spray particles. Mist infers that the diameter of the suspended liquid is generally between 30 microns and 50 microns.

While misting systems are much more effective for dispensing repellents, the repellent mist will eventually fall out of the air and lose its effectiveness. What is needed is a safe and effective repellant dispersion system for use out-of-doors.

BRIEF SUMMARY OF THE INVENTION

The present invention is directed to an ultrasonic repellent humidifier for dispersing insect repellant into the air as a micro fine repellent vapor. A repellent tank provides rhodinol and cedarwood oil based repellent to a repellent well. An ultrasonic transducer is positioned in the well beneath the level of the repellent. It vibrates, forming a repellant vapor that is drawn into a vapor duct by a forced air system and out of the unit, dispersing the repellent vapor into the surrounding air. The vibrating portion of the ultrasonic transducer that is exposed to the oil-based repellent is a ceramic material that inhibits residue from forming on the transducer that reduces its efficiency. The ceramic material may be formed on the metal case of the transducer or on the piezoelectric oscillation crystal, or it may be a separately replaceable disc.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIGS. 3A, 3B, 3C and 3D are diagrams depicting various views of the nebulizer section of a repellent humidifier for exterior use in accordance with an exemplary embodiment of the present invention;

Figure 1A:
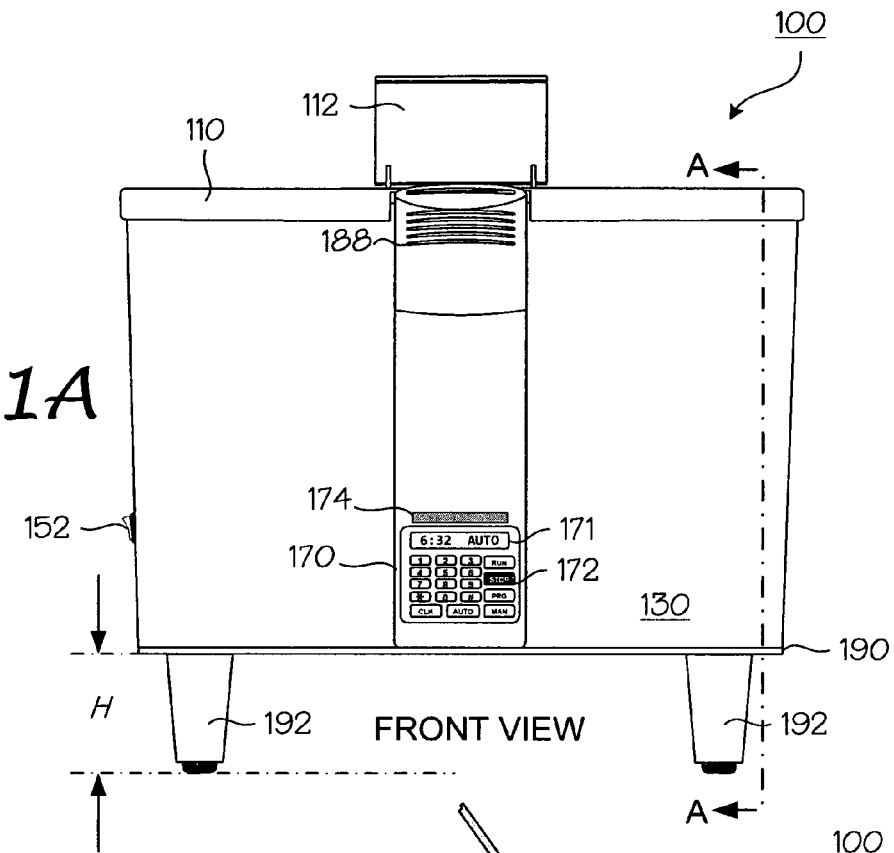
FIGS. 1A and 1B show the front and side views of a repellent humidifier for exterior use in accordance with an exemplary embodiment of the present invention.
Figure 1B:
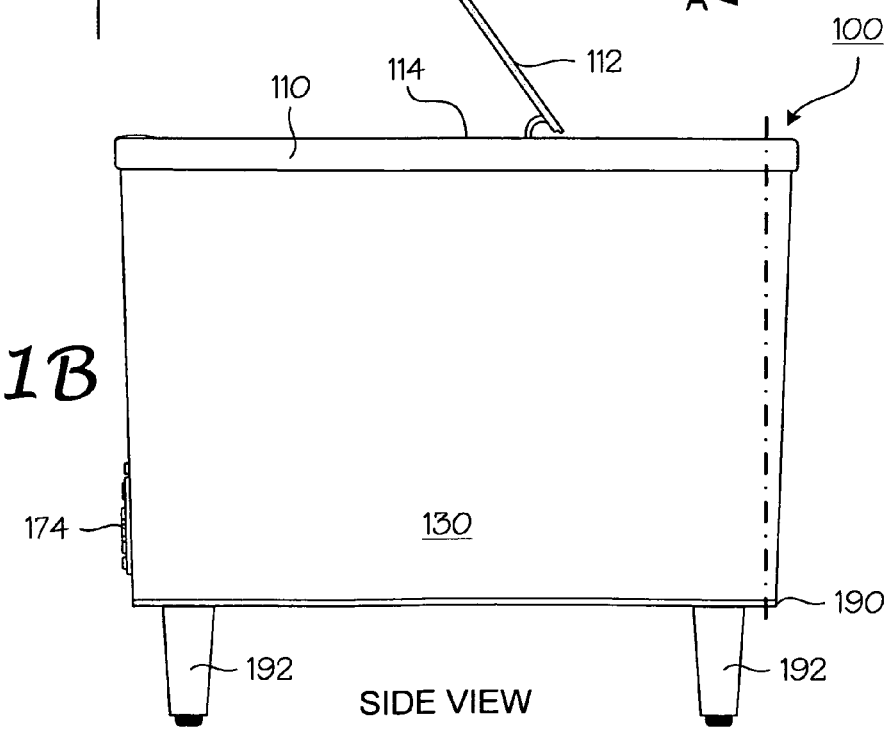
Figure 2:
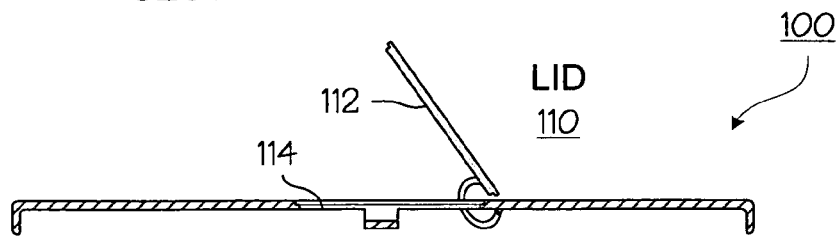
FIG. 2 is a diagram depicting an exploded cross-sectional view of the sections of a repellent humidifier for exterior use in accordance with an exemplary embodiment of the present invention.
Figure 2:
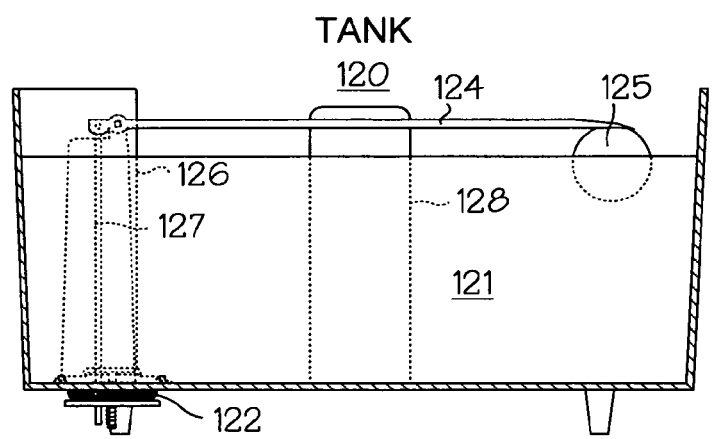
Figure 2:
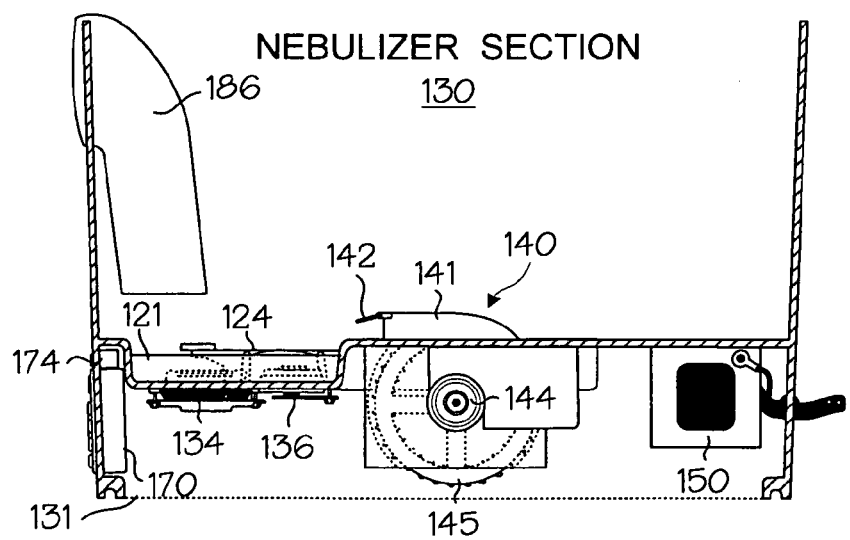
Figure 2:
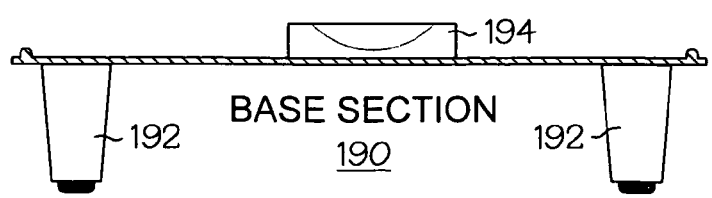

Other features of the present invention will be apparent from the accompanying drawings and from the following detailed description.

DETAILED DESCRIPTION OF THE INVENTION

Element Reference Number Designations

100: Ultrasonic Humidifier
110: Lid Section
112: Tank Fill Cover
114: Tank Fill Opening
120: Tank Section -continued 121: Insect Repellant
122: Tank Valve
124: Tank Float Assembly
125: Tank Float
126: Float Assembly Pedestal
127: Switch Actuating Rod
128: Tank Handle
130: Humidifier Section
131: Nebulizer Volume
132: Repellant Well
133: Sump
134: Ultrasonic Transducer Assembly
135: Ultrasonic Transducer Assembly
136: Well Level Switch
137: Well Level Sensor
138: Tank Level Switch
139: Tank Level Switch Cover
140: Fan
141: Fan Shroud
142: Shroud Louver
143: Fan Motor Support
144: Fan Motor
145: Fan Impeller
146: Optional Battery
147: Optional Battery Charger/Rectifier
148: Optional Low Voltage Input
150: Transformer
151: AC Input
152: GFI Power Switch
163: Well Float Contact
164: Well Float Assembly
165: Well Float
166: Well Assembly Pedestal
170: Control Panel
171: Display
172: Panel Input Buttons/Switches
174: Motion Sensor
184: Optional Diverter
186: Vapor Duct
188: Vapor Vents/Register
190: Bottom Section
192: Legs
194: Air Vent
196: Fan Shroud
202: Transducer Case
204: Silicon Rubber
206: Transducer Jacket
208: Transducer (Piezoelectric Crystal)
210: Ceramic Cover
212: Seal/O-ring Humidifiers are a well known devices for saturating air with water vapor and are of generally two types: evaporative and mechanical. Evaporative humidifiers evaporate water molecules in the air either by raising the temperature of the water (by using a heat coil) or by increasing the surface area of the water and decreasing its surface tension (by using a wick or filter). Vapor type evaporative humidifiers have many disadvantages such as high energy use, residue and scale accumulation and they are often incompatible with ingredients in the water that result from the thermal energy breaking down or altering certain chemical components. Wick-type humidifiers are relatively inefficient in the moderate to high relative humidity range and the wick demands constant cleaning. Mechanical type humidifiers utilize either a spinning impeller or an ultrasonic element to disperse small droplets of water in the air without heating. In the first type, a rotating drum is partially immersed in a water bath and as it spins, it picks up water and flings it at a diffuser, which breaks the water into fine particles that float in the air.

Ultrasonic humidifiers and nebulizers are well known devices for exciting a liquid to such a level that the liquid evaporates without the addition of any thermal energy. Certain medications have a synergistic effect when vaporized, such as vaporizing water with eucalyptus oil for use as a decongestant. One of the selling points of ultrasonic nebulizers is that the vapor they produce has more consistent, uniform and smaller particle size compared to other types of nebulizer technology. Particle size with the impeller type nebulizers can be more varied and larger, simply because of the interaction between the water droplets traveling at different speeds from the drum to the diffuser, whereas ultrasonic vibrations are constant, reliable and steady. It has long been understood that the more uniform, smaller particle sizes makes the medicated mist penetrate more deeply into the lungs. Ultrasonic humidifiers generally operate by imparting mechanical energy to a liquid thereby exciting the liquid molecules without increasing the intrinsic heat of the liquid. Thus, a liquid may be subjected to a rapidly vibrating (or oscillating) component in order to absorb enough mechanical energy to change its physical state through a process known as inertial cavitation. Although the cavitation process appears rather mundane, it is a violent process that sets up mechanical energy fields, such as acoustical, that can damage surrounding mechanisms and is a major source of wear for propellers and impellers. Cavitation occurs at an ultrasonic transducer which vibrates rapidly, first oscillating in the negative direction which creates an ultra-low pressure void in the water adjacent to the transducer that pulls in water vapor and then in the positive direction that forces the water vapors into bubbles and away from the transducer; the result is often referred to as 'pulverized water.' This vibrating energy also has a detrimental effect of breaking down certain unstable components into potentially harmful subspecies and ions which may damage certain components of the device, in much the same manner as heating the liquid might. Therefore, humidifiers are not suitable for vaporizing every type of liquid. Furthermore, the entire device is subjected to emersion in the vaporized liquid, so every part of the device is exposed to potentially detrimental effects of the vaporized liquid compounds. Consequently, humidification and nebulizing devices are typically employed in highly structured environments and under supervised conditions.

Ultrasonic type humidifiers are well known in the prior art as exemplified by U.S. Pat. Nos. 4,752,422, 4,752,423 and 4,921,639, which are incorporated herein by reference in their entireties. These describe, generally, a unit with a water well in which a high frequency ultrasonic transducer is immersed. The transducer typically comprises a piezoelectric crystal which vibrates rapidly, producing a fine water vapor which is dispersed into the atmosphere by an air current from a blower fan.

Mechanical humidifiers do not selectively atomize only water but they disperse water and whatever contaminants are contained in the water at approximately proportional concentrations. Therefore, mechanical humidifiers will disperse repellants effectively without some of the disadvantages associated with heating the liquid repellent. However, because ultrasonic humidifiers do not thermally vaporize only the water molecules, or disinfect it, they also disperse any suspended material in the water to the air such as microorganisms and minerals.

The present invention relates to an ultrasonic humidifier suitable for dispersing repellents for repelling nuisance insects in an exterior environment. FIGS. 1 through 5 are diagrams of the different views of an ultrasonic repellent humidifier in accordance with exemplary embodiments of the present invention. FIGS. 1A and 1B show the front and side views of the external features of repellent humidifier 100. As will be discussed below, repellent humidifier 100 generally comprises four discrete sections: lid section 110; tank section 120 shown in FIG. 4; nebulizer section 130 shown in FIG. 3; and bottom section 190 shown in FIG. 5 (see also the exploded cross-sectional views shown in FIG. 2). Repellent humidifier 100 is an automated repellent dispersing system for exterior usage that is relatively maintenance free. It disperses cool vaporized repellent in the air having particle sizes between 0.03 microns and 15.0 microns depending on the surface tension and viscosity of the repellent and the operating frequency of the ultrasonic transducer. The transducer, which will be discussed in greater detail below with regard to FIG. 8, will operate at the resonance frequency of the piezoelectric crystal it is made from, but optimally will operate between 1600 kHz to 1750 kHz, which may be excited by a drive current oscillating at approximating the resonance frequency of the piezoelectric crystal. In operation, repellent humidifier 100 is intended for exterior use only, therefore all of the components should be sealed and water tight to avoid humidity related failures and should meet Underwriters Laboratories Inc. certification requirements.

Turning to FIGS. 1A and 1B, repellent humidifier 100 has control panel 170 with buttons/switches 172 for programming its operation and display 171 for monitoring inputs and operating parameters. Buttons/switches 172 of control panel 170 is depicted in the exemplary embodiments as being attached to repellent humidifier 100, but in accordance with other embodiments buttons/switches 172 may be an detachable handheld remote for programming control panel 170. For simplicity, all of the processing, memory, control, timing and safety components for repellent humidifier 100 are represented by control panel 170. Optionally, repellent humidifier 100 may have motion sensor 174 for sensing local motion and initiating an automated run sequence for dispensing repellent at vents 188 (depicted in the exemplary embodiment as being stationary but may be louvered and/or adjustable for dispersing the repellent in a particular direction). Tank fill cover 112 is provided in lid 110 that exposes fill opening 114 for replenishing the volume of tank 120 with repellent 121. Tank fill cover 112 is provided with a water resistant sealing gasket for forming a water tight bond with lid 110 and around fill opening 114. As the unit is designed for exterior usage, it will be exposed to direct and indirect ultraviolet (UV) rays from the sun, so the outer shell material must resist ultraviolet light or have a UV protective coating added. Furthermore, repellent 121 may also be sensitive to ultraviolet light, so the entire structure of the unit should be opaque to block harmful UV rays from reaching repellent 121. The inner compartments, tank section 120 should be constructed from chemical resistant material, such as polyethylene, in order to resist damage from repellents.

One exemplary repellent for use in repellent humidifier 100 is a composition of geraniol (sometimes referred to as rhodinol which is derived from the Geranium plant but also may occur naturally in lemon, citronella and other essential oils), cedarwood oil and a surfactant (approximate concentrations geraniol 4%, cedarwood Oil 1%, surfactant, such as sodium lauryl sulfate 0.75% with inert ingredients of xanthan gum, citric acid and water in the remaining 94.25%). The insect repelling properties of geranium plants have been long understood and Geraniol, an ingredient extracted from geranium oil, provides a natural, safe and extremely effective insect repellent. Geraniol has been tested by the University of Florida, and has been proven in various laboratory and field tests to be the best available flying insect repellent available, even better than DEET. Geraniol is a natural, pesticide-free product, which requires no EPA registration. Cedarwood oil, which has been touted as being an effective treatment for many hair and skin disorders, congestion and coughs, also has proven repellent properties. In addition, it lends a light musky wood scent to the fragrance of the Geraniol. Because both geraniol and cedarwood oil are lighter than water, a surfactant must be used as a wetting agent that lowers the surface tension of the two oils with the water, allowing for easier mixing and lowering of the interfacial tension between the oils and water. Other natural repellents that may be substituted or used in addition to those above are citronella oil (*Cymbopogon Winterianus*), lemongrass oil (*Cymbopogon Citratus*), rosemary oil (*Rosemarinus Officinalis*), Wintergreen oil (*Gaultheria Procumbens*) and thyme oil (*Thymus Vulgaris*).

One disadvantage of using an oil based repellent is that it tends to reduce the effective life expectancy of the ultrasonic transducer and other electrical components. The repellent oil readily adheres to metal surfaces. As the repellent is atomized, a residue of oil and oil byproducts is left on the vibrating part of the transducer (the diaphragm). This coating immediately reduces the efficiency of the energy transfer between the transducer and liquid and left untreated, it thermally isolates the transducer from the liquid, thereby accelerating thermal failure. Another problem is that the humidifier components that come in contact with the repellent vapor will eventually exhibit a thin oil film. While this film is easily cleaned from the exterior, its conductive properties will shorten the life expectancy of high voltage and electronic components it contacts.

Figure 3A:
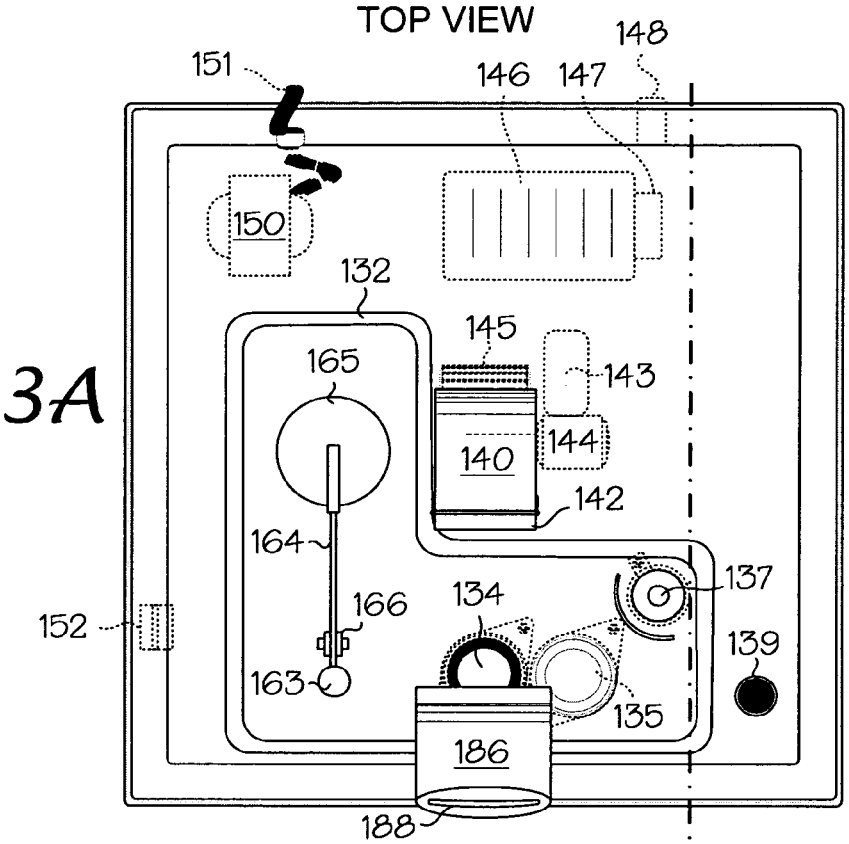
Figure 3B:
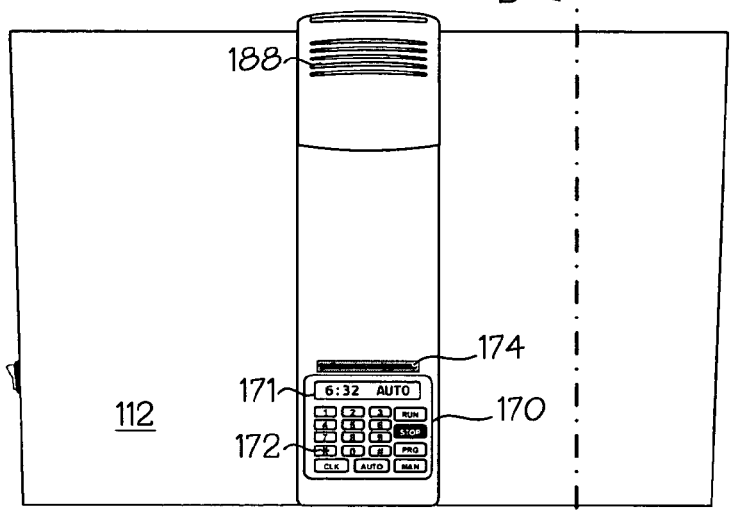
Figure 4A:
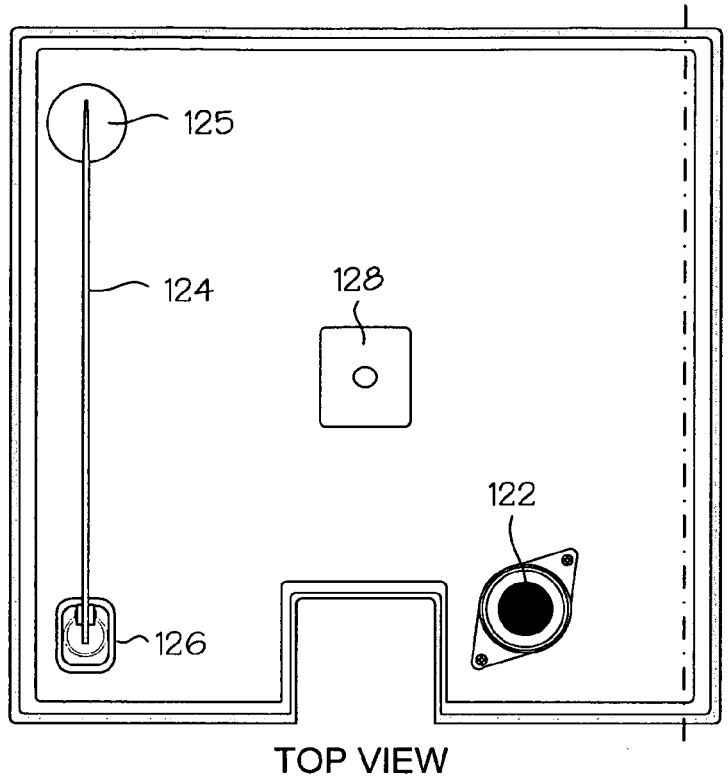
FIGS. 4A, 4B and 4C are diagrams depicting various views of the repellent tank section of a repellent humidifier for exterior use in accordance with an exemplary embodiment of the present invention.
Figure 4B:
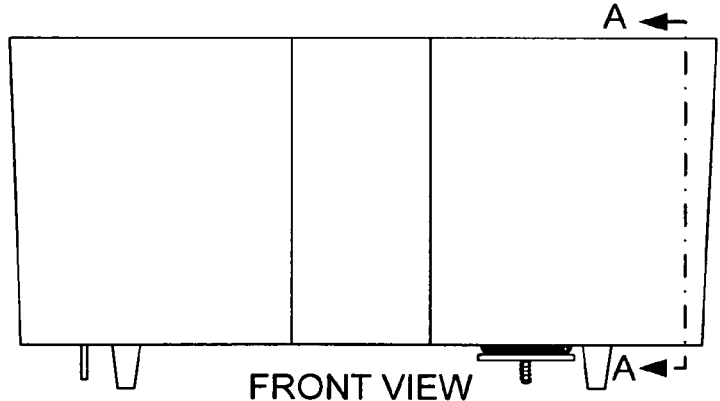
Figure 4C:
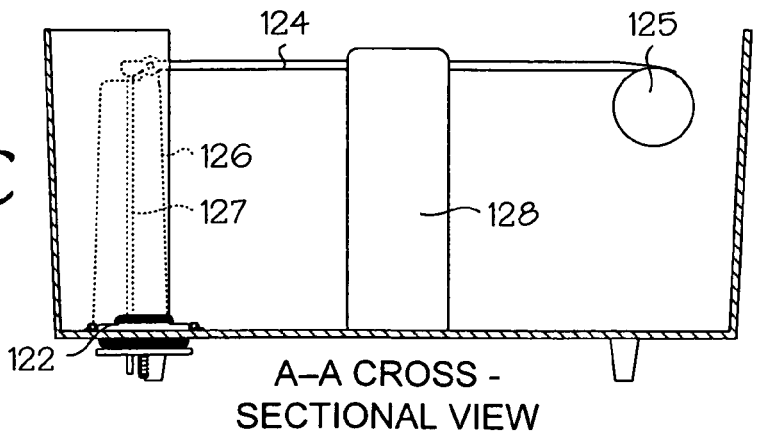

In accordance with one exemplary embodiment of the present invention, repellent humidifier 100 comprises nebulizer volume 131 which contains all of the electrical components, has forced ventilation for air cooling, but is isolated from the repellent vapor generated in nebulizer section 130; see nebulizer section 230 of FIG. 3. Nebulizer volume 131 is defined by the horizontal portion and lower sides of nebulizer section 130 and base section 190. As depicted in FIGS. 2 and 3A through 3D, contained within nebulizer volume 131 is transformer 150 that receives AC power from three-pronged external power cord 151 coupled through GFI power switch 152. Control panel 170 that receives power from transformer 150 and both ultrasonic transducer assembly 134 and blower assembly 140 receive controlled power and/or drive currents from control panel 170. Although the present repellent humidifier 100 is depicted as a stationary device that receives power from a household AC power supply, the device consumes relatively little electricity and can, therefore, be powered by optional battery 146 that is recharged via optional battery charger/rectifier 147, or instead receive power directly from a 12 VDC source through optional low voltage input 148. Thus, repellent humidifier 100 may be operated from a car battery for trips to the beach or camping, tailgating or picnicking.

Figure 5A:
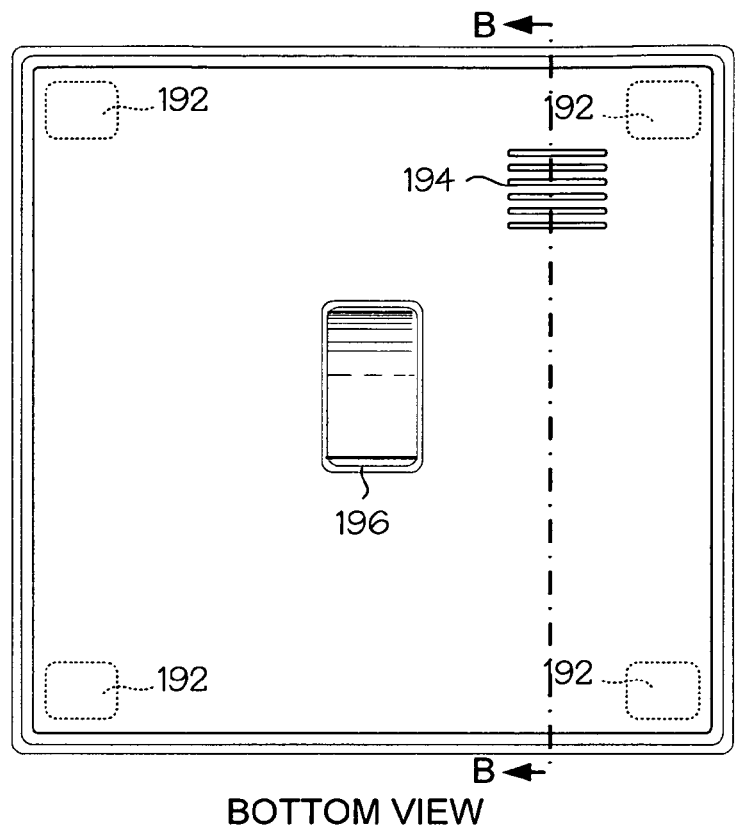
FIGS. 5A, 5B and 5C are diagrams depicting various views of the base section of a repellent humidifier for exterior use in accordance with an exemplary embodiment of the present invention.
Figure 5B:
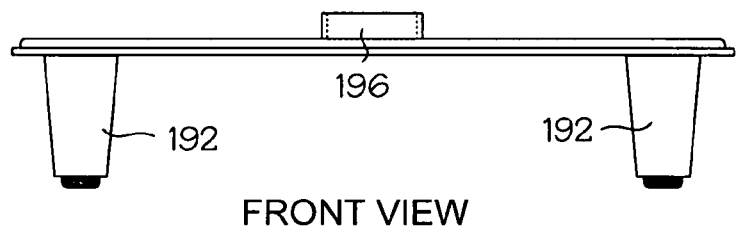
Figure 5C:
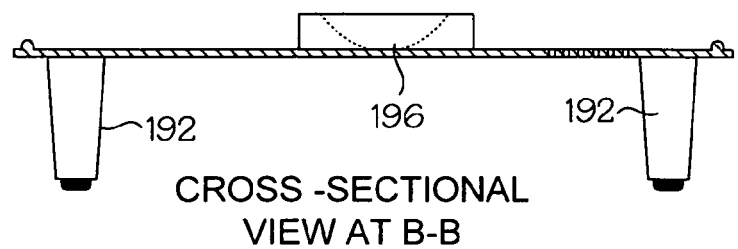

Blower assembly 140 is depicted as comprising motor 144, mechanically coupled to squirrel cage fan 145 and which is enclosed on the lateral and top sides by fan shroud 141. Fan shroud 141 has an air intake inlet (not shown) in a center portion of shroud 141 proximate to the axle of motor 144 and an exhaust outlet above the horizontal portion of nebulizer section 130 (the lowermost portion of the fan shroud is affixed to base section 190, shown in FIGS. 5A through 5C as lower fan shroud 196). That exhaust opening is movably covered by shroud louver 142 when blower assembly 140 is idle, thereby isolating nebulizer volume 131 from any vaporized repellent that may be present in the nebulizer section 130 and protecting the electrical components located therein. Blower assembly 140 is depicted as a squirrel cage fan but may be any type fan system.

Figure 9:
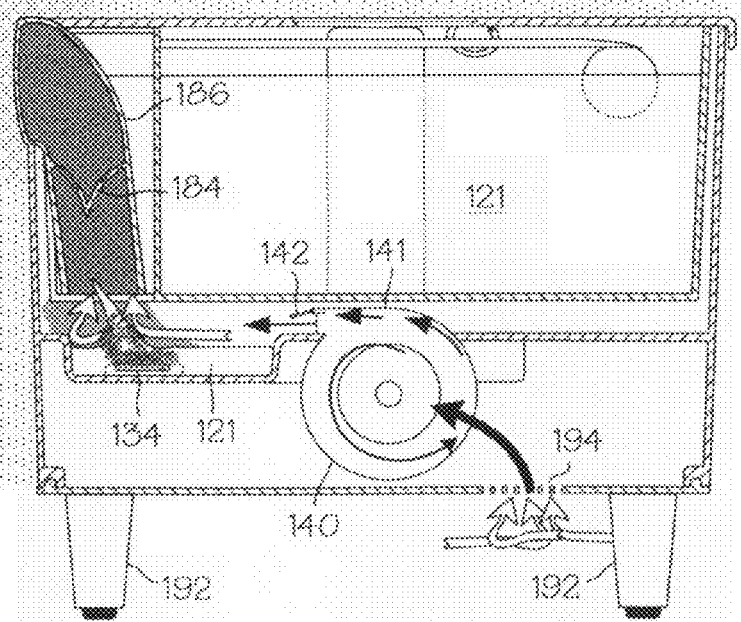
FIG. 9 is a diagram depicting a cross-sectional view of a repellent humidifier showing the air flow and repellent vapor paths in accordance with an exemplary embodiment of the present invention.

Briefly turning to FIG. 9, air from blower 140 is directed toward the surface of repellant 121 in well 132 proximate to the vibrating surface of ultrasonic transducer 134. As repellent is vaporized, it is forced out of well 132 and into the stream of air from shroud 141. Directing the air stream toward the vibrating surface of ultrasonic transducer 134 keeps the upper level of repellent in well 132 agitated, thereby lessening instances of oil and other contaminants adhering to the vibrating surface of the transducer. The repellent vapor mixes with the moving air and is swept upward into vapor duct 186 and egresses repellent humidifier 100 at vapor vents/register 188. While vents 188 are depicted in the figures as stationary openings, they may instead be comprised of louvers and/or repositionable register vents for altering the direction and dispersing pattern of the repellent.

The present invention is intended to disperse a micro fine vapor of repellent particles into a control area. However, directing the air stream toward the surface of the repellent sometimes causes larger droplets of repellent to enter vapor duct 186 with the repellent vapor. This condition is more prevalent at higher air velocities and with the use of high energy transducers that tend to form tall water cones over the vibrating disc (see FIG. 8A). Repellent adhering to the sides of vapor duct 186 may be also swept out of the humidifier as large droplets of repellent. Any type of dispersal pattern other than a micro fine vapor of repellent particles is an inefficient use of the repellent. Slotted inverted cone-shape diverter 184 may be installed in the throat of vapor duct 186 as shown in FIG. 9. Slots in inverted cone-shape diverter 184 provide high speed paths for channeling micro particles of repellent that are away from the sidewalls and away from the center of the duct. The obstructions along the circumference and center of inverted cone-shape diverter 184 collect larger and slower droplets and provide a path of relatively calm air for the larger droplets to return to well 132 either along the sidewalls of duct 186 or at the center of the cone.

During operation, repellent 121 resides in repellent well 132, completely covering the vibrating portion of ultrasonic transducer assembly 134 and well level sensor 137 (which is electrically coupled to switch 136). At least a portion of well float 165 of float assembly 164 is also immersed in repellent 121 of well 132. Well float 165 tracks the level of the repellent 121; as the repellent is vaporized from well 132, the fluid level drops causing well float contact 163 to engage and actuate tank valve 122 (see FIGS. 5A and 5B). Once actuated, tank valve 122 releases repellent from tank section 120, thereby replenishing repellent 121 in well 132 to a predetermined level (see FIGS. 7A and 7B). Optimally, the level of repellent 121 in well 132 is approximately 1.0 in. to 1.75 in. above the vibrating surface of transducer assembly 134, depicted as distance $h_1$ in FIGS. 6A and 6B.

Those of ordinary skill in the art will readily understand that the present embodiment is exemplary in nature designed for ease in understanding the present invention and than many of the components may be substituted with equivalent components or eliminated altogether. For instance, the mechanical level indicators (tank float assembly 124 and well float assembly 164) described herein may be substituted with electronic fluid level measurement devices. However, one advantage of using a mechanical device for maintaining the repellent level in well 132 is that the well will be filled regardless of whether or not repellent humidifier 100 is connected to an electrical power source. Anytime the repellent evaporates, an oil residue is left on the surfaces. Thus, if repellent 121 evaporates from well 132, a film residue will be left on the upper surface of the transducer, which may lower its efficiency, or worse, lower its operational life.

Figure 6A:
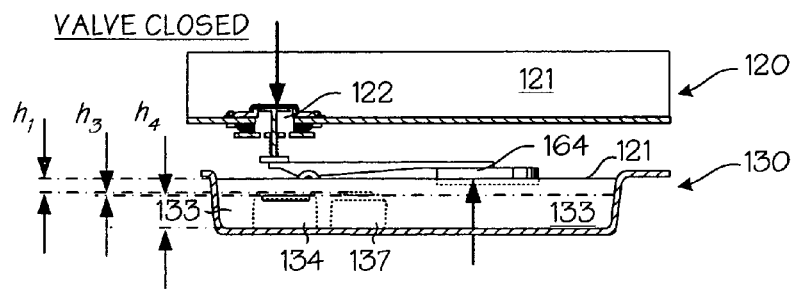
FIGS. 6A and 6B are diagrams depicting cross-sectional views of portions of the tank and nebulizer sections of a repellent humidifier showing the operation of the repellent tank valve in accordance with an exemplary embodiment of the present invention.
Figure 6B:
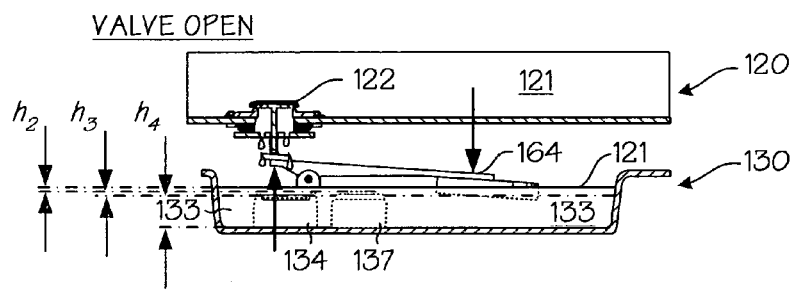
Figure 7A:
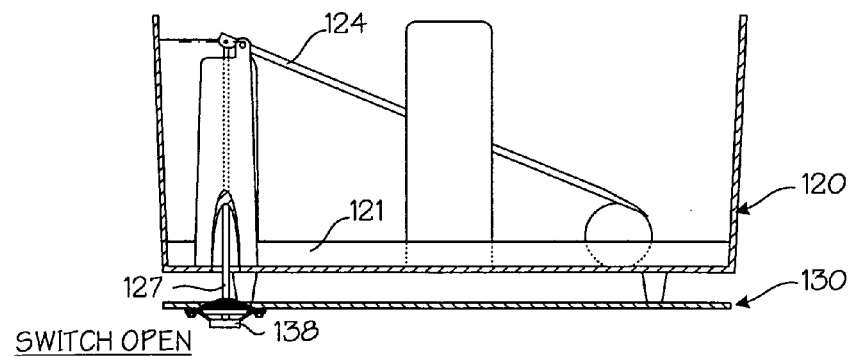
FIGS. 7A and 7B are diagrams depicting cross-sectional views of portions of the tank and nebulizer sections of a repellent humidifier showing the operation of the tank level switch in accordance with an exemplary embodiment of the present invention.
Figure 7B:
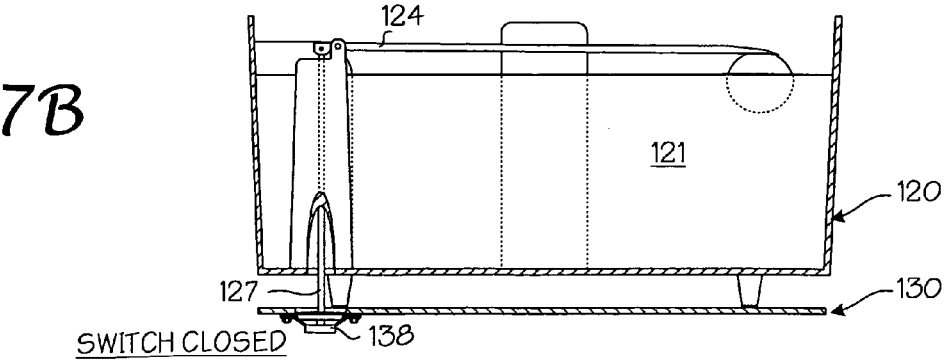

The repellent level in well 132 should remain at least 0.25 in. to 0.5 in. above the vibrating surface of transducer assembly 134, depicted as distance $h_2$ in FIGS. 6A and 6B. Therefore, well float assembly 164 should actuate tank valve 122 where $h_2 > 0.25$ in., preferably 1.0 in.$> h_2 > 0.5$ in. The heat generated by transducer assembly 134 during operation is dissipated by repellent 121 in well 132. If the surface of transducer assembly 134 is uncovered, the transducer will fail in short order. As a safety precaution, well level sensor 137 is positioned approximately 0.125 in. to 0.25 in. above the surface of transducer assembly 134, depicted as distance $h_3$ in FIGS. 6A and 6B. When well level sensor 137 senses well 132 is running dry and the vibrating surface of transducer 134 is in jeopardy of becoming uncovered, i.e., $h_3 \approx 0.125$ in., well level sensor 137 will actuate well level switch 136, which in turn signals control panel 170 to deactivate the ultrasonic transducer. In order to prevent repellent humidifier 100 from cycling on and off, control panel 170 may delay any action until it receives a constant signal from well level switch 136 for five or ten seconds, thereby ensuring that well 132 is running dry and not receiving a false report from well level sensor 137 from being temporarily uncovered by a combination of a low repellent level and turbulence in the repellent from the air flow. Once the signal has been accepted, control panel 170 will then immediately turn off the ultrasonic transducer and flash a low fluid warning across display 171. Control panel 170 may also immediately turn off the blower assembly, or in accordance with another exemplary embodiment of the present invention, control panel 170 may instead delay disengaging blower 140 for a few seconds. By allowing the blower to continue running for a few seconds after the ultrasonic transducer is switched off, any repellent vapor still inside repellent humidifier 100 is exhausted to the atmosphere before it can settle down into nebulizer volume 131 and contaminate the electrical components therewithin. Control panel 170 may run blower 140 for a few seconds following any run cycle to vent repellent vapor from repellent humidifier 100.

Also located within nebulizer volume 131 is tank level switch 138 which is a second safety switch for alerting the user that the repellent tank is in need of refilling, thereby avoiding an unnecessary interruption in dispensing repellent. Tank level switch 138 is a spring loaded, normally open switch that protrudes through the horizontal surface of nebulizer section 130 at tank level switch cover 139. Tank switch level cover 139 seals nebulizer volume 131 but does not impede the movement of the switch. Turning to FIGS. 4A, 4B, 4C, 7A and 7B notice that tank float assembly 124 is hingedly attached to float assembly pedestal 126 above the highest level for repellent 121 within tank section 120. Switch actuating rod 127 extends from tank float assembly 124, through the interior of float assembly pedestal 126 and engages tank level switch 138 through tank level switch cover 139. As the level of repellent 121 in tank section 120 recedes, ball 125 tracks the fluid level causing switch actuating rod 127 to move up. At some point, switch actuating rod 127 displaces tank level switch 138 enough to activate the switch and signal the control panel 170 and thus the user that the repellent should be replenished.

Tuning again to FIGS. 5A through 5C, base section 190 of repellent humidifier 100 is shown in accordance with an exemplary embodiment of the present invention. Base section 190 seals the lowermost portion of nebulizer volume 131 and should form an air and water-tight seal. When in place, lower fan shroud 196 cooperates with fan shroud 141 of nebulizer section 130 completely enclosing fan impeller 145 except for the intake opening (not shown). Blower assembly 140 draws fresh air from the exterior of repellent humidifier 100 through air vent 194 and into nebulizer volume 131. The fresh air circulates around the electrical components prior to being captured by fan 145 and forces through shroud 141, past open louver 142 and into nebulizer section 130. Because repellent humidifier 100 draws air from beneath base section 190, legs 192 should provide clearance of approximately 2.0 in. In accordance with other embodiments, air vent 194 may be located on a sidewall of nebulizer section 130, below its horizontal surface.

In the exemplary configuration using a single ultrasonic transducer, repellent humidifier 100 will continuously repel insects from a 1,000 sq. ft. control area for thirty hours while consuming approximately two gallons of repellent. Control panel 170 includes a programmable menu for scheduling repellent treatment at a predetermined time, such as in the morning and evening hours of weekends when people are about and insects are most active. Control panel 170 also incorporates a programmable countdown time for activating the device for a preset time period. Then, a user merely activates button 172 labeled AUTO, and repellent humidifier 100 disperses repellent for the preset time period. One method of extending the repellent is by dispersing it in short cycles for a preset time period, rather than in a continuous dispersion, for instance alternating cycles of ten minutes ON and five minutes OFF, or cycles of five minutes ON and ten minutes OFF. Alternatively, a manual override RUN button may also be included for running the unit longer than the preset time period. Humidifiers designed for internal use will often have a moisture sensitive rheostat for deactivating the run cycle at a predetermined relative humidity, and thus not inducing too much moisture into the air. Because repellent humidifier 100 is designed for outdoor use, sensing the surrounding relative humidity may be of little importance since the outdoor relative humidity would probably override the dispersing time period causing the device to shut off too early, especially in humid climates. Furthermore, because the present invention disperses micro fine particles of repellent, only a small amount of repellent is necessary for controlling nuisance insects, and the moisture content of the ambient air (the relative humidity) may not be affected. Instead, repellent humidifier 100 may include an optional motion detector 174 for sensing movement and dispersing repellent in conjunction with movement. This feature is even more important for use in areas that need insect control when humans are not present to activate the device. These are places where parasitic insects may be attracted for nonhuman hosts, and may transmit Lyme disease, heart worms, viral encephalitis, Eastern and Western equine encephalitis, West Nile virus and the like to their nonhuman hosts. Included in these places are aviaries, barns, kennels, stables and dairies.

As depicted in the figures of the exemplary embodiments, tank section 120 will accommodate one and a half to four gallons of repellent, but in accordance with other exemplary embodiments of the present invention the tank may hold ten or more gallons of repellent. Repellent humidifier 100 is depicted as having only a single ultrasonic transducer 134. The exposed portion of the vibrating surface should be approximately 2.0 in. in diameter to vaporize enough repellent to efficiently repel insects from a 1,000 sq. ft. control area. In accordance with other exemplary embodiments depicted in FIGS. 3A and 3C, the repellent humidifier may be configured with multiple ultrasonic transducers, either to increase its capacity or longevity. There, exemplary ultrasonic transducer 134 is depicted as being supplemented with a second transducer, exemplary ultrasonic transducer 135, but others may also be included. In accordance with one exemplary embodiment, the multiple ultrasonic transducers may be activated simultaneously in order to increase the capacity of the unit for control areas greater than 1,000 sq. ft. Alternatively, the multiple ultrasonic transducers may be activated alternatively in order to extend that time between transducer services. The present configuration of repellent humidifier 100 may be further optimized by using a dual speed blower for more rapidly dispersing repellent at start up. After a predetermined time has elapsed, the blower reverts to its normal and slower run speed.

Figure 8A:
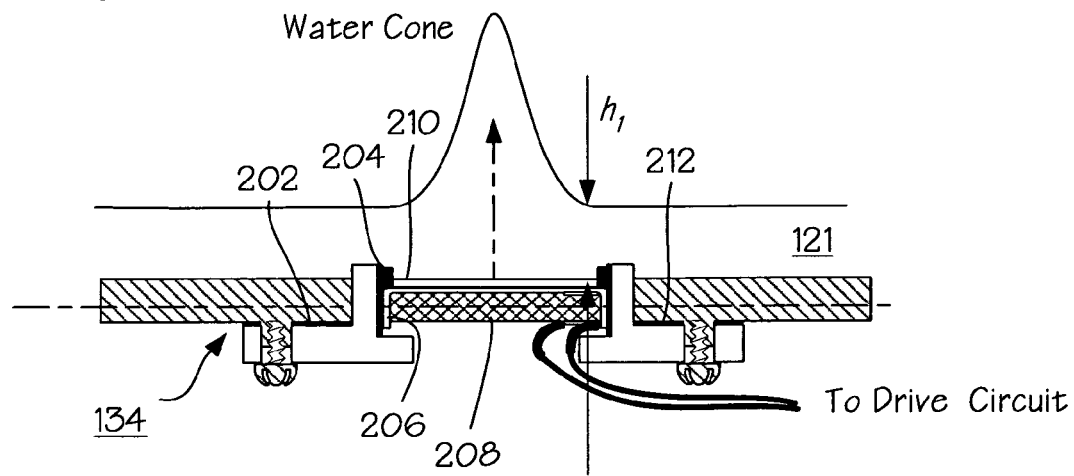
FIGS. 8A, 8B and 8C are diagrams depicting cross-sectional views of an ultrasonic transducer installed in a portion of the nebulizer section of a repellent humidifier showing in accordance with various exemplary embodiments of the present invention.
Figure 8B:
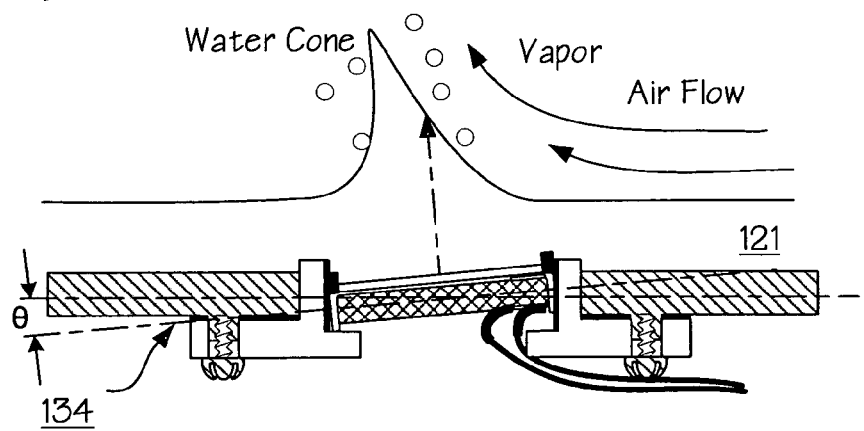
Figure 8C:
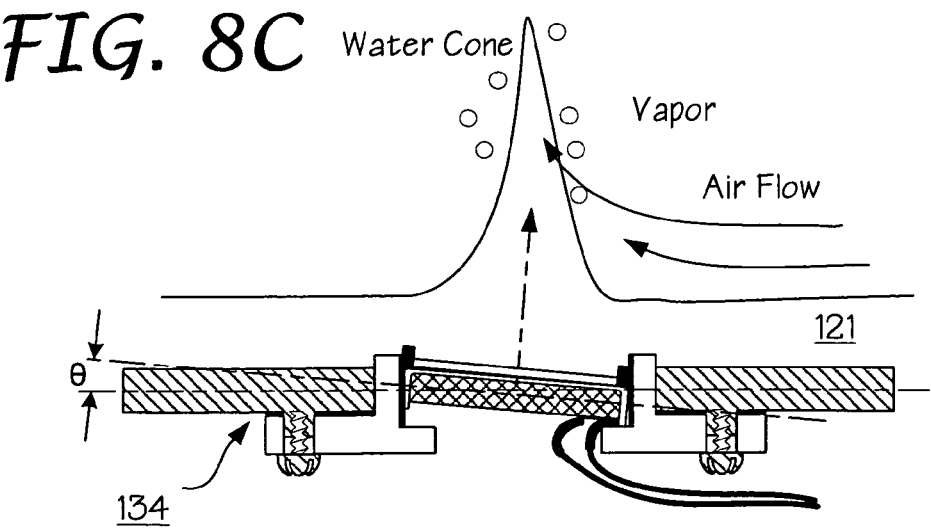

Turning now to FIGS. 8A, 8B and 8C, the construction and operation of an ultrasonic transducer is shown in accordance with exemplary embodiments of the present invention. As mentioned elsewhere above, ultrasonic transducers for vaporizing water abound and are extremely well known. However, those designs are intended for interior usage and for vaporizing water having a purity consistent with drinking or pool water. Using such humidifier designs out-of-doors for oily repellents will result in failure from a variety of factors. All else being equal, the purity of the air ingested by the present repellent humidifier also presents a serious challenge as outdoor air contains large concentrations of dust, pollen, spores, mold and bacteria not usually present indoors. These contaminants present two separate problems: hygiene and maintenance. One solution to molds and bacteria is to deposit aqueous silver ions to well 132, such as by using the Ionic Silver Stick water purification technology (Ionic Silver Stick is registered by and available from Plaston AG of Switzerland). These silver ion cartridges last approximately one year and then must be replaced. Additionally, the interior surfaces of the humidifier may be coated or impregnated with an antimicrobial substance such as Microban (Microban is registered to and available from Microban International Ltd. of New York, N.Y.).

Even though these solutions will suppress the growth of harmful bacteria, mold and some viruses, they do little to stem the inordinate amount of contaminants ingested into the unit from the air stream. Obviously, filtering air at air vent 194 will reduce the amount of contaminants entering the system, but a filter adds an additional maintenance item for the user. As a practical matter, the vast majority of contaminates will travel straight through the device, and while they will have an effect on particle size, they will not reduce the effectiveness of the particle size to any measurable amount. Some particles will, however, be captured by liquid repellent 121 in well 132. Those contaminates are first addressed by the design of well 132. A reservoir well in a typical humidifier is usually an inch deep or less. The vibrating surface of the ultrasonic transducer is positioned near the bottom of the well (with the exception of perhaps the fluid level indicator, the transducer is near the deepest portion of the reservoir). Any contaminates captured in the water of the reservoir will settle out and saturate the bottom of the reservoir, while the upper level of the reservoir water will be relatively free of contaminates. The contaminates will cover the vibrating surface of the transducer and after periods of inactivity, the contaminates will adhere to the transducer, thereby lowering its efficiency. The oils and oil byproducts in the repellent further bind the contaminates to any metal surfaces present in the well, such as the transducer diaphragm.

This problem is partially overcome in the present invention by providing a sump below the level of the vibrating surface of the transducer. Turning again to FIGS. 6A and 6B, the depth of the water column above the vibrating surface of the transducer is shown as $h_1$ and $h_2$, depending on the level of water in the well. Sump distance, shown as $h_4$, is typically only a few millimeters in prior art humidifiers, perhaps up to 0.25 in. In accordance with an exemplary embodiment of the present invention, the depth of sump 133 $h_4$ is deepened to create a low energy environment conducive to holding contaminates. In the present invention, sump depth $h_4$ may exceed 1.0 in. depending on the air velocity and the type and concentration of contaminates in the air. While the bottom of the sump 133 in well 132 must be cleaned from time to time, the cleaning frequency is much less than the maintenance cycle of the ultrasonic transducer.

The second solution to contaminates, and for anything that might stick to the vibrating surface of ultrasonic transducer assembly 134, is to select a nonstick surface that does not inhibit the transfer of ultrasonic energy to the repellent or causes heat to accumulate in the piezoelectric crystal of the transducer. Turning now to FIG. 8A, ultrasonic transducer assembly 134 is shown in accordance with an exemplary embodiment of the present invention. Ultrasonic transducers take many forms, but the exemplary transducer comprises mounting case 202 with a flanged opening for securely holding the transducer in place. Mounting case 202 is secured to the bottom of well 132 by fasteners with seal/o-ring 212 there between. The transducer comprises piezoelectric crystal 208 that converts electrical energy to high frequency mechanical energy (inaudible sound) and is usually silver soldered to a pair of electrical leads. Piezoelectric crystal 208 is not usually exposed to the water in humidifiers but is separated by metal disc 206 (the disc may be of any shape and in some applications a screen is substituted for a solid disc). The disc may actually be in the form of a cap or encase the entire piezoelectric crystal. The energy created by piezoelectric crystal 208 vibrates metal disc 206, causing the water to cavitate. Piezoelectric crystal 208 and metal disc 206 are held securely by UL approved silicon rubber 204 that surrounds the opening in mounting case 202. Metal disc 206 is typically fabricated from stainless steel, nickel plated or layered steel, or titanium. In either case, the oils and oil byproducts of the repellent readily adhere to the surface of metal disc 206 and its efficiency rapidly degrades. It appears that the metal surface attracts the oils and/or repels the surfactant in the repellent, resulting in an oil residue on the metal. The oil residue can usually be cleaned, but adds another maintenance item for the user. Oil mixed with airborne contaminates, and biological material is far more stubborn to clean. Often, the most expeditious solution is to simply replace the entire ultrasonic transducer assembly 134, thereby greatly increasing the cost of operation of the unit. In accordance with an exemplary embodiment of the present invention, piezoelectric crystal 208 is separated from repellent 121 by ceramic disc 210 rather than the metal jacket. The repellent oils and oil byproducts are not attracted to the ceramic material in the manner of the metal disc and the surface of the ceramic disc remains pristine longer. Contaminates and particulate matter that does settle on ceramic disc 210 does not adhere to the ceramic to the extent as with the metal. In most cases, any oil residue that is present can usually be brushed off of the surface of ceramic disc 210 without replacing it. Metal disc 206 may be interposed between piezoelectric crystal 208 and ceramic disc 210 without any loss of efficiency. Therefore, in accordance with still another exemplary embodiment of the present invention, ceramic disc 210 may be separately replicable from piezoelectric crystal 208. In that case, ceramic disc 210 may be separately cleaned or replaced without disturbing ultrasonic transducer assembly 134 and without incurring the costs.

As mentioned elsewhere above, during operation ultrasonic transducer assembly 134 forms a water cone that tends to induce the formation of larger sized particle droplets. The force of the forced air from blower 140 sweeps these large repellent droplets into the exhaust duct 186 and out of the machine causing a spray of repellent. Aside from using a diverter in the duct, ultrasonic transducer assembly 134 can be oriented for maximum vapor product with a minimally sized water cone. Cavitation efficiency is severely decreased as angle a diverges from horizontal. On the other hand, the size of the water cone in the air stream can be decreased by increasing angle θ in the direction of the air stream, see FIG. 8B. With the water cone oriented away from the air stream, less repellent is spattered and drawn up into the duct as large sized droplets. Decreasing angle θ in the direction of the air stream tends to build the water column like an offshore breeze causes ocean waves to build, see FIG. 8C. Not only is the water column taller with more surface area for creating larger droplets, but it presents a larger obstacle to the air stream that induces a low pressure zone on the backside of the water cone that is further conducive for droplet formation. Therefore, piezoelectric crystal 208 and ceramic disc 210 should be oriented slightly in the direction of the air flow, thereby reducing the size of the water cone. Optimally, angle should be between 5.0 and 9.0 degrees, preferably around 7.0 degrees off horizontal.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An ultrasonic repellent humidifier for dispersing insect repellant into the air as a micro fine repellent vapor, comprising:
   a repellent tank having an interior tank volume for holding repellent;
   a repellent well disposed substantially below said repellent tank and having an interior well volume for holding repellent, said repellent well further comprising a sump defined as a lowermost portion of the interior well volume for accumulating repellent;
   a repellent tank valve for metering repellent from the repellent tank to the repellent well;
   a well fluid level assembly for tracking a level of repellent in the repellent well and actuating the repellent tank valve to replenish the level of repellent in the repellent well when the level of repellent drops below a predetermined level;
   a tank fluid level assembly for tracking a level of repellent in the repellent tank;
   a tank level switch mechanically coupled to the tank fluid level assembly and signaling the electronic controller when the fluid level in the repellent tank drops below a predetermined level;
   an ultrasonic transducer for pulverizing repellent into a micro fine repellent vapor, said ultrasonic transducer coupled to the repellent well the ultrasonic transducer comprising:
   an electro-mechanical converter;
   a ceramic vibrating surface disposed between the electro-mechanical converter and the interior well volume of the repellent well and substantially above the sump; and
   a seal disposed between the ultrasonic transducer and the repellent well;
   a blower for generating an air stream, said blower comprising:
   an impeller;
   a blower motor; and
   an electronic controller for controlling the ultrasonic transducer and the blower.

2. The ultrasonic repellent humidifier recited in claim 1, wherein the electronic controller further comprises a countdown timer for deactivating one of the ultrasonic transducer and the blower in a predetermined time period after activation.

3. The ultrasonic repellent humidifier recited in claim 2, wherein the repellent comprises one of geraniol and cedarwood oil.

4. The ultrasonic repellent humidifier recited in claim 1 further comprises:
   a repellent.

5. The ultrasonic repellent humidifier recited in claim 1, further comprises:
   a transformer; and
   an AC power connection.

6. The ultrasonic repellent humidifier recited in claim 5, further comprises:
   a nebulizer compartment for holding at least a portion of the ultrasonic transducer and the blower.

7. The ultrasonic repellent humidifier recited in claim 6, wherein the blower further comprises:
   an impeller shroud surrounding the impeller and having an inlet and an outlet for directing an air stream into the nebulizer compartment and toward the repellent well.

8. The ultrasonic repellent humidifier recited in claim 7, wherein said blower motor further comprising:
   a movable outlet cover for covering the outlet in absence of the air stream.

9. The ultrasonic repellent humidifier recited in claim 1, further comprises one of:
   a DC power connection;
   a battery;
   a rectifier; and
   a battery charger.

10. The ultrasonic repellent humidifier recited in claim 1, further comprises:
    a well fluid level sensor for sensing a predetermined repellent level in the repellent well and signaling the electronic controller in response to sensing the predetermined repellent level.

11. The ultrasonic repellent humidifier recited in claim 1, further comprises:
    a motion detector electrically coupled to the electronic controller for sensing movement proximate to the ultrasonic repellent humidifier and signaling the electronic controller in response to movement.

12. The ultrasonic repellent humidifier recited in claim 1, wherein the ceramic vibrating surface has an area greater than three inches squared.

13. The ultrasonic repellent humidifier recited in claim 1, wherein the ultrasonic transducer further comprises:
   a plurality of ultrasonic transducers for pulverizing repellent into a micro fine repellent vapor, said ultrasonic transducer assembly coupled to the repellent well at an opening of the repellent well, each of the plurality of ultrasonic transducers comprising:
   a respective electro mechanical converter;
   a respective ceramic vibrating surface disposed between the respective electro-mechanical converter and the interior well volume of the repellent well and substantially above the sump; and
   a respective seal disposed between the respective ultrasonic transducer and the repellent well.

14. The ultrasonic repellent humidifier recited in claim 13, wherein the electronic controller selectively activates one of the plurality of ultrasonic transducers at alternating run cycles.

15. The ultrasonic repellent humidifier recited in claim 1, wherein the interior volume of the repellent tank exceeds three hundred and fifty cubic inches.

16. The ultrasonic repellent humidifier recited in claim 1, wherein said sump extending beneath the ceramic vibrating surface of the ultrasonic transducer more than 0.5 inches.

17. The ultrasonic repellent humidifier recited in claim 1, wherein the ceramic vibrating surface is oriented off horizontal by more than four degrees.

18. The ultrasonic repellent humidifier recited in claim 1, wherein the electronic controller further comprises a cycle timer for cyclically activating one of the ultrasonic transducer and the blower for a first predetermined time period and deactivating the one of the ultrasonic transducer and the blower for a second predetermined time for at least two cycles.

19. The ultrasonic repellent humidifier recited in claim 1, the well fluid level assembly further comprising:
   a well float for tracking a level of repellent in the repellent well.

20. The ultrasonic repellent humidifier recited in claim 19, the well fluid level assembly further comprising:
   a well fluid level mechanical assembly coupled to the well float for translating a level of repellent indication from the well float to mechanical movement.

21. The ultrasonic repellent humidifier recited in claim 20, further comprising:
   the repellent tank valve metering repellent from the repellent tank to the repellent well in response to the mechanical movement from the well fluid level mechanical assembly.

22. The ultrasonic repellent humidifier recited in claim 1, further comprising:
   an external case surrounding at least the repellent well; and
   a vapor duct having a first opening proximate to the repellent well and a vent at a second end thereof which traverses the external case.

23. The ultrasonic repellent humidifier recited in claim 22, further comprising:
   a slotted inverted cone-shape diverter within the vapor duct for channeling micro particles of repellent away from sidewalls of the vapor duct and for collecting larger droplets of repellant and providing a path of relatively calm air in the vapor duct for returning the larger droplets to the repellant well.

24. The ultrasonic repellent humidifier recited in claim 1, further comprising:
   a base compartment surrounding an inner impeller inlet opening of said impeller of the blower for receiving clean air;
   a nebulizer compartment surrounding at least a portion of said repellent well, at least a portion of said ultrasonic transducer and an impeller outlet opening, for receiving the micro fine repellent vapor;
   an external case surrounding at least a portion of the nebulizer compartment and the base compartment; and
   a vapor duct having a first opening in the nebulizer compartment and a vent at a second end thereof which traverses the external case.

25. The ultrasonic repellent humidifier recited in claim 24, wherein the blower motor is disposed within the base compartment.

26. The ultrasonic repellent humidifier recited in claim 24, further comprises:
   a power transformer disposed within said base compartment.

27. The ultrasonic repellent humidifier recited in claim 1, further comprises:
   a transducer case for mechanically coupling the ultrasonic transducer proximate to said interior well volume of the repellent well.

28. The ultrasonic repellent humidifier recited in claim 27, wherein said seal being disposed between said transducer case and said interior well volume of the repellent well.

29. The ultrasonic repellent humidifier recited in claim 1, further comprising:
   a vibrating surface seal disposed between said ceramic vibrating surface and the interior well volume of the repellent well.

30. The ultrasonic repellent humidifier recited in claim 1, wherein said repellant well further comprises a transducer opening in the repellent well to the interior well volume of the repellent well, said ultrasonic repellent humidifier further comprising:
   a transducer case for mechanically coupling the ultrasonic transducer to the transducer opening of the repellant well.

31. The ultrasonic repellent humidifier recited in claim 30, wherein said seal being disposed between said transducer case and said interior well volume of the repellent well, said ultrasonic repellent humidifier further comprising:
   a vibrating surface seal disposed between said ceramic vibrating surface and said transducer case, thereby hydraulically isolating said electro-mechanical converter from the interior well volume of the repellent well.

32. The ultrasonic repellent humidifier recited in claim 1, wherein said blower motor further comprising:
   a dual speed blower motor, wherein said electronic controller operates said dual speed blower motor at a first speed at startup for a predetermined time and a second speed subsequent to the predetermined time, wherein the first speed is greater than said second speed.

33. The ultrasonic repellent humidifier recited in claim 1, wherein the impeller is a squirrel cage impeller, said blower further comprises:
   an impeller shroud surrounding the squirrel cage impeller and having an inlet and an outlet for directing the air stream toward the repellent well.

34. The ultrasonic repellent humidifier recited in claim 1, further comprises:

a user interface electrically coupled to said electronic controller for providing user instructions to said electronic controller.

35. The ultrasonic repellent humidifier recited in claim 1, further comprises:

a visual display for providing visual information on said ultrasonic repellent humidifier.

36. The ultrasonic repellent humidifier recited in claim 1, further comprises:

a display for providing alpha-numeric information on said ultrasonic repellent humidifier.

* * * * *